(12) United States Patent
Weitzel

(10) Patent No.: US 7,330,267 B1
(45) Date of Patent: Feb. 12, 2008

(54) DEVICE AND METHOD FOR OPTICAL SPECTROSCOPY

(75) Inventor: Thilo Weitzel, Tübingen (DE)

(73) Assignee: Campus Technologies AG, Ipsach (CH)

( * ) Notice: Subject to any disclaimer, the term of this patent is extended or adjusted under 35 U.S.C. 154(b) by 0 days.

(21) Appl. No.: 09/958,397

(22) PCT Filed: Apr. 7, 2000

(86) PCT No.: PCT/EP00/03145

§ 371 (c)(1),
(2), (4) Date: Feb. 22, 2002

(87) PCT Pub. No.: WO00/62026

PCT Pub. Date: Oct. 19, 2000

(30) Foreign Application Priority Data

Apr. 9, 1999 (DE) .............................. 199 16 072
May 18, 1999 (DE) .............................. 199 22 783
Jul. 15, 1999 (DE) .............................. 199 33 290

(51) Int. Cl.
*G01B 9/06* (2006.01)
(52) U.S. Cl. .................................................. 356/456

(58) Field of Classification Search ................ 356/450, 356/451, 452, 454, 456, 521
See application file for complete search history.

(56) References Cited

U.S. PATENT DOCUMENTS 5,059,027 A * 10/1991 Roesler et al. ............... 356/456

FOREIGN PATENT DOCUMENTS

| EP | 0415143 | 3/1991 |
| EP | 0682278 | 11/1995 |
| EP | 0767361 | 4/1997 |

OTHER PUBLICATIONS

Patent Abstracts of Japan, vol. 17, No. 596 (P-1636) Oct. 29, 1993, & JP 05 180 696A, Jul. 23, 1993.
Patent Abstracts of Japan, vol. 16, No. 247 (P-1365), Jun. 5, 1992 & JP 04 055 726A, Feb. 24, 1992.

* cited by examiner

*Primary Examiner*—Hwa (Andrew) Lee
(74) *Attorney, Agent, or Firm*—Dilworth & Barrese LLP

(57) ABSTRACT

The invention relates to an apparatus for optical spectroscopy having means to produce an interference pattern and having a spatially resolving detector which can record the interference pattern produced. In accordance with the invention, the wavefronts of at least one of the part rays involved in the interference pattern is influenced in dependence on the wavelength by spectrally dispersive or diffractive optical elements.

32 Claims, 21 Drawing Sheets

Ideal Interferogram

Example For A "Real" Interferogram

DEVICE AND METHOD FOR OPTICAL SPECTROSCOPY

BACKGROUND OF THE INVENTION

The present invention relates to an apparatus and method for optical spectroscopy.

Optical spectrometers can be divided into dispersive or diffractive spectrometers and Fourier transform spectrometers.

Dispersive (prismatic) spectrometers or diffractive (grating) spectrometers break down the incident light ray into its spectral components by the wavelength dependency of an angle of diffraction or of an angle of reflection. The different spectral components are thereby spatially separated and the spectral component to be determined can be selected (monochromator). The recording of a spectrum then takes place with the aid of moving parts by the different spectral components being successively selected and measured.

Monochromators are most frequently used which have a Czerny-Turner ray path, i.e. which have a rotatable plano grating between an entrance gap and an exit gap and mutually independent collimator mirrors or collector mirrors.

The development of spatially resolving detectors (CCDs, diode arrays) now allows the simultaneous measurement of all spectral components by a separate element of the detector being provided for each spectral component. Such an arrangement does not require any moving parts and uses the available incident light substantially more efficiently.

Modern instruments use, for example, a holographic optical grating which can image an entrance gap directly onto a diode array with suitable spectral dispersion.

Fourier transform spectrometers are based on an interferometer in which the difference in the optical path lengths of the part rays brought into interference can be set with high precision. The spectrum can be determined by Fourier transformation from a measurement of the interference signal over a suitable range of path length differences.

Instruments are as a rule set up in the manner of a Michelson interferometer. However, above all the mechanical components for the setting of the optical path lengths by displaceable mirrors or tiltable mirror pairs are technically demanding here. The possible performance capability of dispersive or diffractive spectrometers depends on certain parameters, in particular on the dimensions of the entrance or exit gap, on the focal length and the aperture of the imaging elements and on the properties of the dispersive or diffractive element itself. Modern instruments almost reach these physically set boundaries.

The possible performance capability of Fourier transform spectrometers is accordingly determined by certain parameters and, here, in particular by the distance and the step width for the variation of the optical path lengths. The performance capability of Fourier transform spectrometers exceeds the possibility of dispersive or diffractive spectrometers by a long way.

Fourier transform spectrometers can also almost reach the physical boundaries of their performance capability, but the technical effort is very high in such a case. As Fourier transform spectrometers are based on an interferometer, all optical components, and in particular also the moving parts, must be produced and positioned with a precision of fractions of the wavelengths to be measured.

SUMMARY OF THE INVENTION

It is the object of the present invention to provide an apparatus and a method by which the advantages of the Fourier transform spectrometer are usable without using moving parts with simultaneously substantially lower demands on the quality of the optical components and, optionally, much shorter measuring times.

The objects are solved in accordance with an apparatus for optical spectroscopy having means to produce an interference pattern and having a spatially resolving detector which can record the interference pattern produced, characterized in that the wavefronts of at least one of the part rays involved in the interference pattern is influenced in dependence on the wavelength by spectrally dispersive or diffractive optical elements, use of an apparatus having means to produce an interference pattern and having a spatially resolving detector and having a means which allow a change in the phase position (phase shift) of at least one of the part rays as an optical spectrometer, and a method for the calculation of an optical spectrum, characterized by the following steps:

(a) recording of a plurality of interference patterns for different relative phase positions of the interfering part rays;

(b) calculation of a highly resolved interference pattern or of highly resolved components of an interference pattern taking into account the differentially pronounced phase shift of the spectral components of the part rays contributing to the interference.

Preferred embodiments are described herein.

The invention comprises an apparatus, which is based on a combination of dispersive or diffractive optical elements and a spatially resolving detector having an interferometer, and a method which allows the spectrum of the incident light to be reconstructed from a recorded interference pattern.

The apparatus of the invention is designed such that the interference patterns of respectively different spectral components of the spectral range to be investigated differ from one another. Such an interference pattern associated with a certain spectral component is called a basic pattern in the following. The patterns can be observed one-dimensionally or two-dimensionally. An interference pattern generated by an apparatus of the invention is observed as a superimposition of a series of respectively different basic patterns.

The recording of the interference pattern takes place by a detector at discrete positions. An interference pattern is therefore present in each case in the form of a fixed number of (measured) values. The accuracy and representable spatial frequencies result from the sampling theory.

In the method of the invention, an interference pattern is interpreted as a series of values and thus, in the context of linear algebra, as a vector or, in particular, as an element of a discrete Hilbert space of the corresponding dimension. The basic patterns introduced above are interpreted as linearly independent basic vectors in the context of linear algebra.

The method of the invention is based on the possibility of determining the respectively required basic patterns for an apparatus of the invention either by calculation or by measurement. With the method of the invention, the spectrum of the incident light can then be gained by breaking down the interference pattern into these basic patterns.

The method can be realized in a variety of ways:

Under favorable circumstances (good signal to noise ratio, fixed phase position, "spectrally tightly" lying basic patterns), a direct calculation of the linear combination can take place using the inverses of the matrix formed by the basic patterns.

As a rule, and in general, the breaking down takes place approximately by correlation of the respective basic patterns with the interference pattern. In this case, no high demands are made on the basic patterns and the possibility exists, for example, of using a plurality of basic patterns at different phase positions for a spectral component.

In the case of the Fourier transform spectrometer, which is based on a completely different direction, the pattern is one-dimensional and the basic patterns are the sums, dependent on the respective phase position, of the sine or cosine components having a spatial frequency clearly given by the wavelength of the respective spectral component. In this ideal case, the spectrum can be determined by a Fourier transformation of the measured interference pattern.

In the case of the interference pattern generated by an apparatus of the invention, the basic patterns are generally not sinusoidal or cosinusoidal. Both the precise kind of the basic functions and the respective connection of a basic pattern to the wavelength of a spectral component is clearly defined by the properties of each specific apparatus.

To the extent that the interference patterns, that is the basic patterns for the possible spectral components, are linearly independent within the framework of the resolution and accuracy of the measurement, the respective spectral components of the incident light and thus the spectrum can be determined by correlation of the respective basic patterns with the recorded interference patterns.

To the extent that the properties of all components of the apparatus are determined with sufficient precision, the required set of basic patterns can be calculated.

The possibility is particularly interesting of measuring a set of basic patterns for the respective specific setup of the apparatus with the help of a suitable adjustable monochromatic reference light source. As the basic patterns already include all kinds of optical aberrations occurring in the respective apparatus in this case, the demands on the optical quality of the components of the apparatus are relatively low to the extent that the basic patterns remain linearly independent.

In accordance with a preferred aspect of the invention, the interference pattern can be generated by splitting the amplitude of the incident light ray (optionally into more than two part rays) with the aid of a semi-reflecting mirror or of a suitable grating and a subsequent superimposition of the rays at the position of the detector. All classical interferometers can be used here which are optionally supplemented by dispersive or diffractive elements, for example: Michelson interferometers, Mach-Zehnder interferometers, Sagnac interferometers, Fabry-Perot interferometers or shear interferometers. In addition, any arrangement can be used which produces interference patterns with spatial periods which the respective detector can resolve. The spatial frequencies occurring at the detector can be selected independently of the wave length range to be investigated in each case by a suitable dimensioning of the apparatus.

Furthermore, the generation of the part rays is also possible by splitting the wavefront, for instance by a Fresnel biprism, by other combinations of a plurality of prisms, with the aid of irregularly shaped surfaces or likewise with the aid of diffractive elements.

The required spatial dispersion can in all cases be introduced by a suitable design of the beam splitter itself or by additional optical elements.

In the one-dimensional case, a suitable diode array or a CCD row can be used as a spatially resolving detector. It is also possible to scan, that is to record the different measuring points successively by a movement of the detector or other components of the apparatus. This method can be used particularly for extremely high-resolution measurements (e.g. scanning of a diode array perpendicular to its extent) or in wavelength ranges for which no suitable spatially resolving detectors are available.

The use of two-dimensional detectors (CCD or others) is particularly interesting, since in this case a substantially greater margin exists for the properties of the basic functions with the increase in the number of the measured values and, with "better" linearly independent functions, the respective correlations can be calculated correspondingly more sharply.

The performance capability of the apparatus and of the method described in the following can be substantially improved if the relative phase position of the part rays can be suitably influenced. This can be done, for instance, by the use of a mirror which is linearly displaceable over a distance in the order of magnitude of the wavelength and by which the relative phase position of the reflected light can be changed with high precision or, for example in the case of a setup of the kind of a shear interferometer, or for example in the case of a grating with a plurality of spatial frequency components as beam splitters, by a suitable "lateral" displacement of the components.

BRIEF DESCRIPTION OF THE DRAWINGS

Further details and advantages of the invention are explained in more detail with reference to embodiments and comparison diagrams represented in the drawings.

DESCRIPTION OF THE PREFERRED EMBODIMENTS

Figure 1:
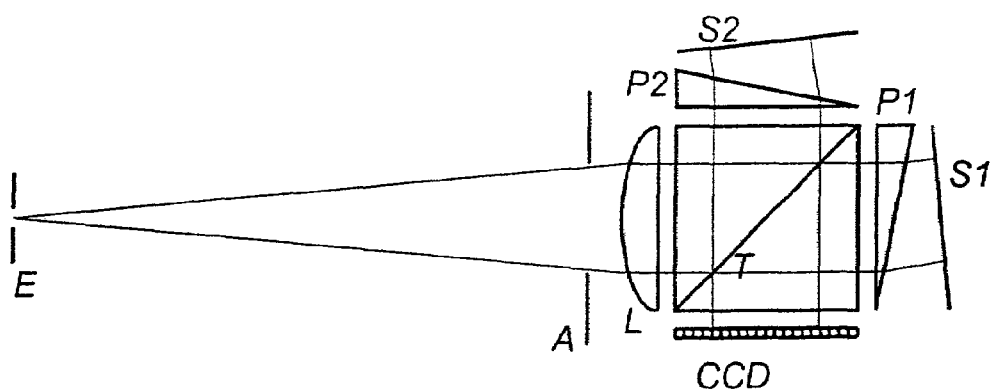

FIG. 1 shows a variant of an apparatus of the invention to generate the interference pattern starting from a setup of the kind of a Michelson interferometer. A CCD serves as the detector, while the dispersive elements are designed as prisms. The setup does not require any moving elements with the exception of the adjustment. The light incident through the entrance opening E and an aperture diaphragm A is first collimated by a lens L and then split by the beam splitter T. The part rays are reflected by the mirrors S1 or S2, recombined by T and reach the spatially resolving detector CCD. The part rays thereby pass through the respective prisms P1 or P2 twice and are thereby influenced in dependence on the wavelength. The interference pattern resulting at the detector therefore shows a great dependence on the wavelength of the incident light.

Depending on the dimensioning and the adjustment of the apparatus, different spectral ranges can be detected with different resolutions.

If one of the mirrors, for instance by mounting on a piezo-mechanical actuator, is designed movably along the optical axis having a wavelength in the region of the wavelength, the relative phase position of the part rays contributing to the interference can be adjusted as required.

Figure 2:
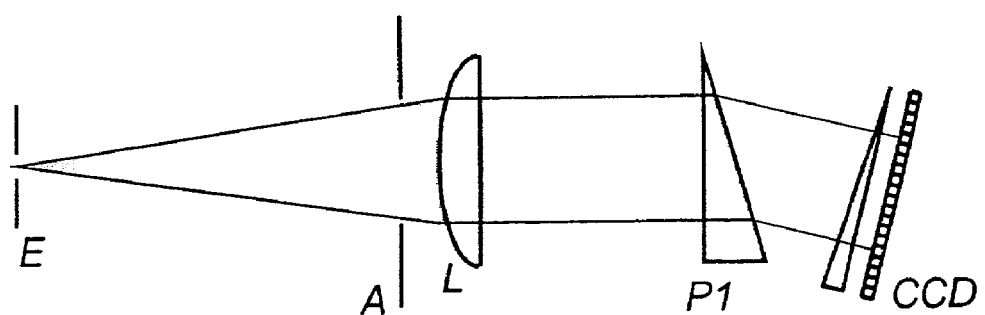

A further variant of an apparatus of the invention uses a prism or any other spectrally dispersive or diffractive element and a further prism having surfaces mirror coated with semi-reflectivity as the beam splitter. FIG. 2 shows such an apparatus which does completely without moving elements.

The light incident through the entrance aperture E and an aperture diaphragm A is first collimated by a lens L and passes through the prism P1. The surfaces of the prism P2 are mirror coated with semi-reflectivity. An interference pattern is produced at the detector CCD since part of the incident light reaches the detector directly, another part of the light only after a double reflection in the prism P2. Further multiply reflected part rays likewise contribute to the interference.

Figure 3:
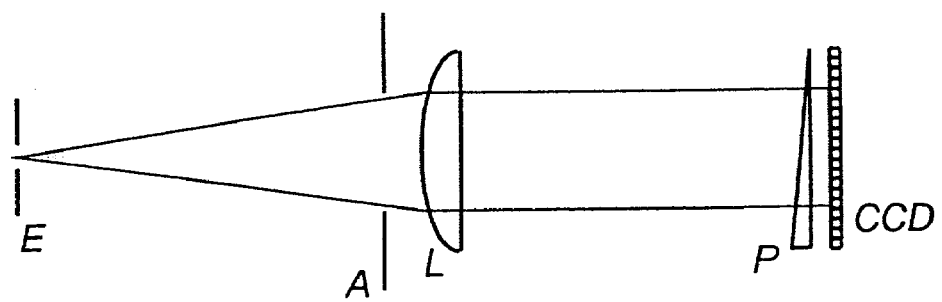

FIG. 3 shows a simple further variant of an apparatus of the invention which uses a prism both as a dispersive element and as a beam splitter. The setup does completely without moving elements.

The light incident through the entrance aperture E and an aperture diaphragm A is first eliminated by a lens L and reaches the prism P. The surfaces of the prism are mirror coated with semi-reflectivity. An interference patters is produced at the detector CCD since part of the incident light reaches the detector directly, another part of the light only after a double reflection in the prism P. Further multiply reflected part rays likewise contribute to the interference.

A similar variant with a suitable thick prism (FIG. 4) is particularly well suited for the recording of line spectra.

In this case, only portions of the incident light having a sufficiently large coherence length, that is correspondingly with a very small line width, contribute to the interference.

A combination of the two said variants is particularly advantageous, that means mounting a plurality of prisms of different thickness and/or inclination next to one another on a single CCD.

Figure 5:
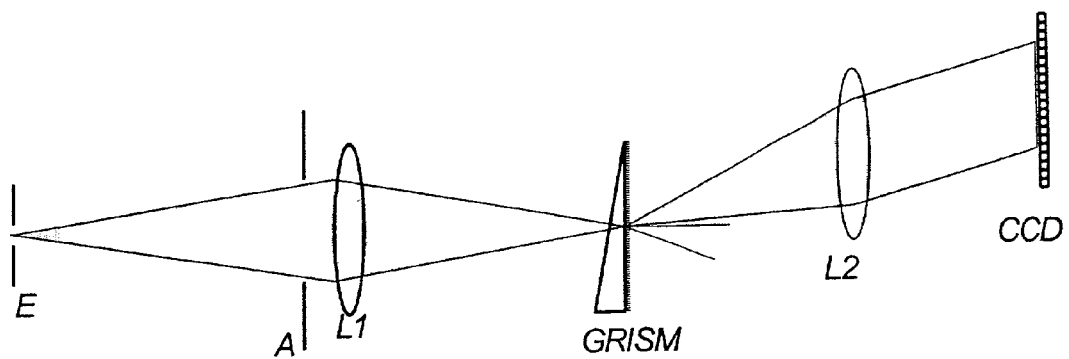

FIG. 5 shows another variant of the apparatus on the basis of a shear interferometer.

The light incident through the entrance aperture E and an aperture diaphragm A is first imaged onto a combination of prism and grating GRISM by a lens L1. The grating carries two components of spatial frequencies so that the first order of diffraction imaged on the detector via the lens L2 correspondingly consists of two components diffracted at slightly different angles. The grating thus acts as a beam splitter and an interference pattern is produced at the detector which is in turn greatly dependent on the wavelength of the incident light.

If the grating or GRISM is mounted by mounting on a suitable actuator such that it is movable transversely to the optical axis, the relative phase position of the part rays contributing to the interference can be set as required.

The interferometric apparatuses represented can be designed or further developed such that an optical resonator is produced. This has the consequence that the apparatuses or parts of the apparatuses are used multiply and the resulting interferences are formed by superimposition of a plurality, optionally of a great number, of part rays. Such a superimposition of many part rays optionally shows very much sharper minima or maxima of intensity compared with the corresponding two-ray interference.

With a suitable treatment of the respective measured values, a correspondingly higher accuracy or spectral resolution can thus be reached.

The technical design of the resonator is of subordinate significance in this respect. In addition to simple resonators with only two components (FIG. 6), all kinds of resonators, in particular also ring cavities, can be used.

Designs are particularly advantageous in which at least one element of the resonator is designed as an element dependent on wavelength or in which an element dependent on wavelength is located inside the resonator (or both).

Figure 6:
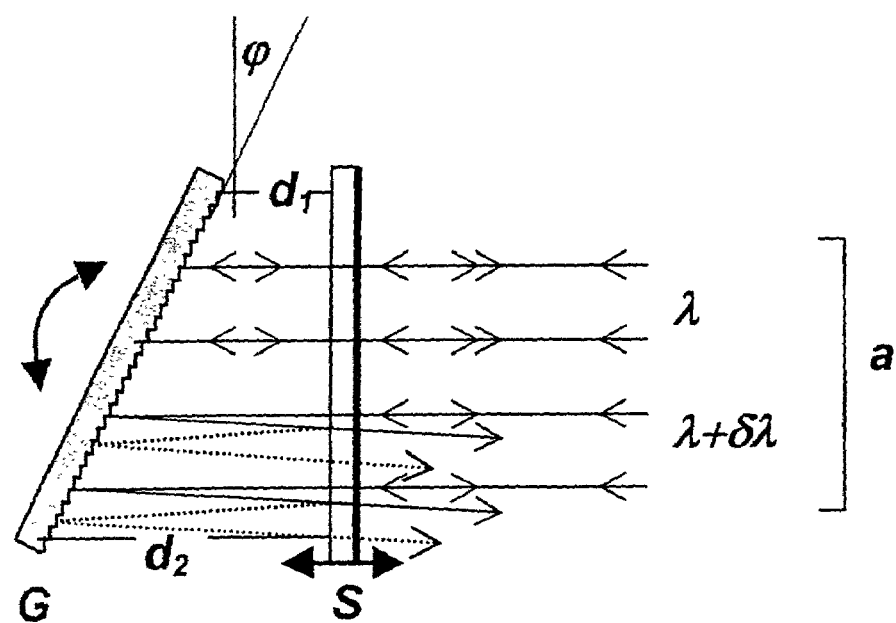

The function is illustrated with reference to FIG. 6:

The beam splitter is formed by a semi-reflecting mirror S which reflects part of the light. The element dependent on the wavelength is designed in the example as a grating G and is dimensioned and arranged (angle $\phi$) such that light of a certain wavelength $\lambda$ is reflected back to the mirror S [grating constant=$\lambda/(2 \sin(_\phi))$]. The part transmitted there interferes with the light originally reflected from the mirror.

Depending on the efficiency of the grating and on the reflection or transmission coefficients of the mirror, multiply reflected rays of different intensity occur which influence the resulting interference patterns in the manner represented above. The relative phase position of the part rays can be influenced by suitable displacement of S.

Figure 7:
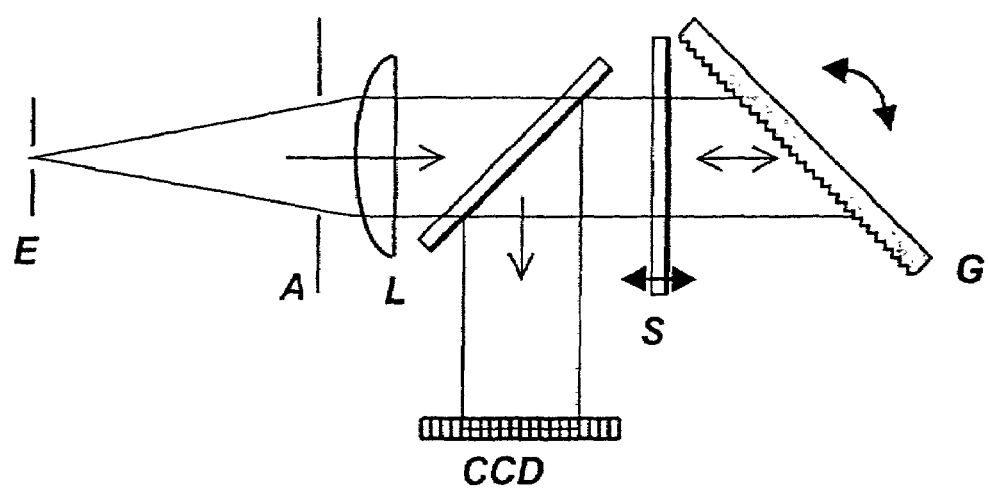

FIG. 7 shows an embodiment of the said functional principle. The resonator is formed by the elements S1 and G. The wavelength of the resonator can be changed by rotation of the grating G, the relative phase position of the part rays can be influenced by suitable displacement of S1. The interference pattern is guided to the spatially resolving detector CCD via a second beam splitter S2. The entrance aperture is marked with E and the aperture diaphragm with A. L is a collimator.

Figure 8:
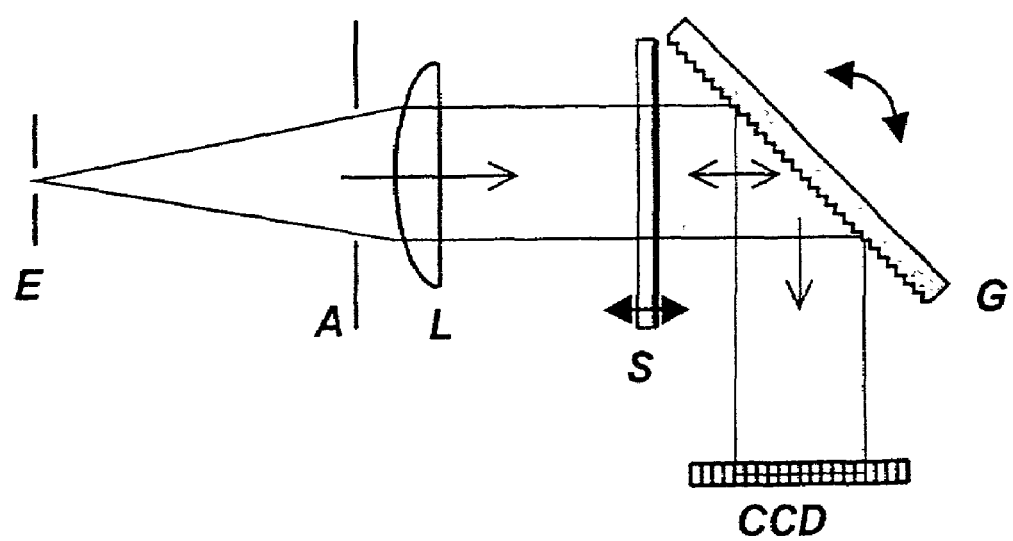

FIG. 8 shows a particularly advantageous embodiment. Here, the 0th order of diffraction of the grating, that is the part of the light reflected without diffraction, is guided to the spatially resolving detector (CCD).

Figure 4:
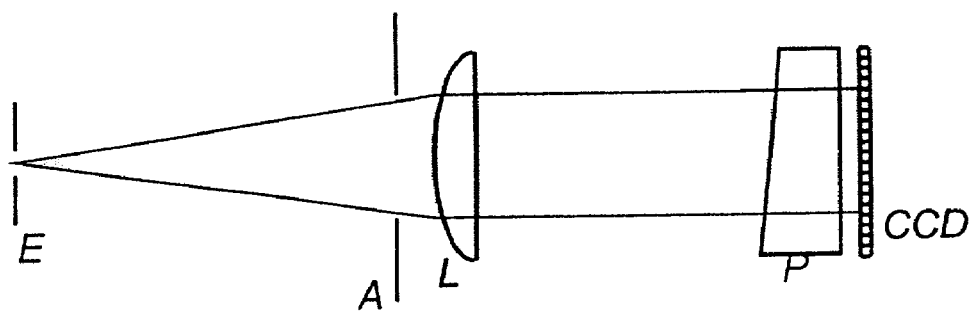
Figure 9:
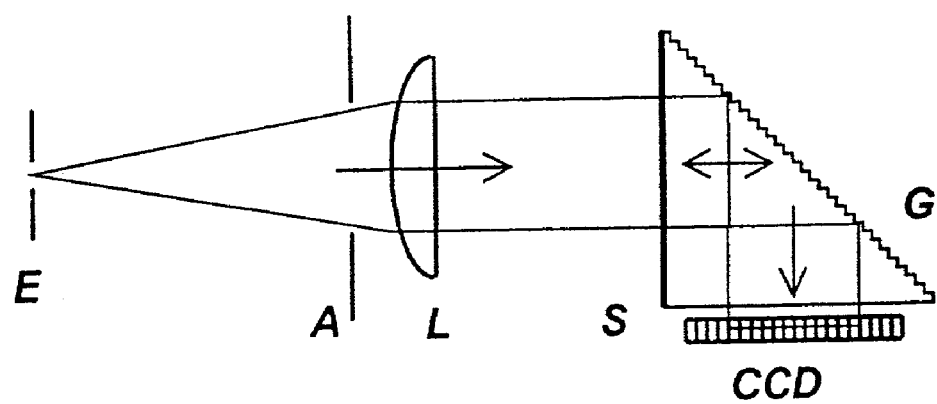

To the extent that a control of the relative phase position can be dispensed with, an embodiment in accordance with FIG. 9 forms an advantageous arrangement. Here, the grating G and the mirror S are disposed on a glass forming a triangle in cross-section (FIG. 4).

Figure 10:
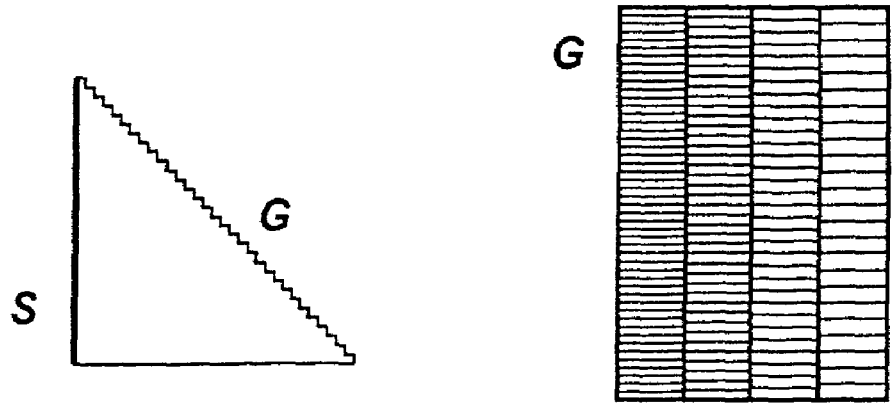

It can be particularly advantageous to divide the diffraction grating G into segments of different grating constants (FIG. 10) or to use diffraction structures which are not periodic.

Figure 11:
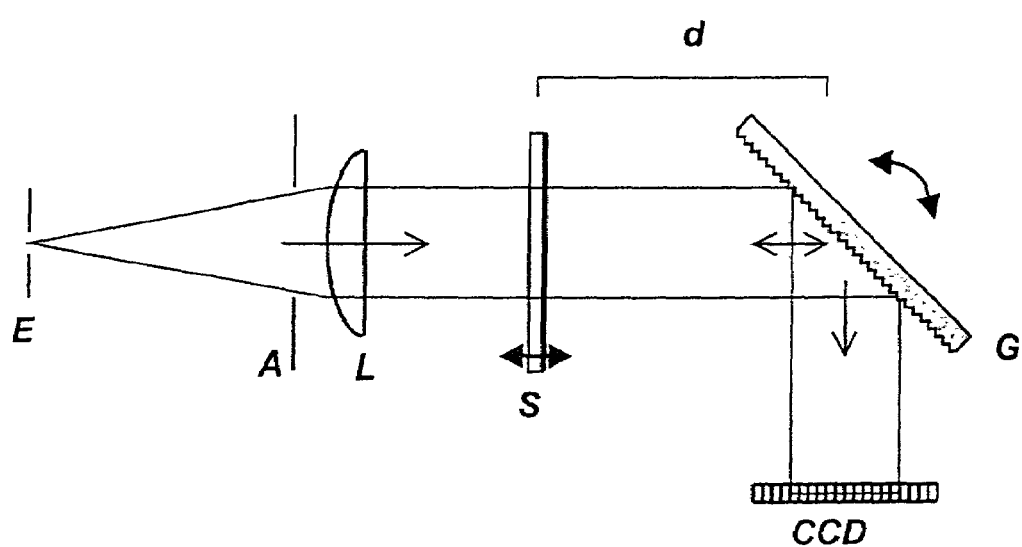

In a further embodiment (FIG. 11), the optical path length d is intentionally enlarged and optionally kept variable. The interferences are then restricted to components of the incident light having correspondingly high coherence length or small bandwidth (depending on the path length d).

With a suitable evaluation of the measured values dependent on d, very high spectral resolutions can be achieved, in particular with a high efficiency of the grating G and a high reflection coefficient of S.

In accordance with a very advantageous aspect of the invention, the apparatus has means to vary the path length difference of the part rays brought to interference, whereby a selection of the light components contributing to the inference can be carried out in accordance with their coherence properties.

The interferometric apparatuses shown can be designed or further developed such that the optical path lengths, at which the part rays are brought to interference, differ beyond a measure introduced by the dispersive element(s).

Figure 12:
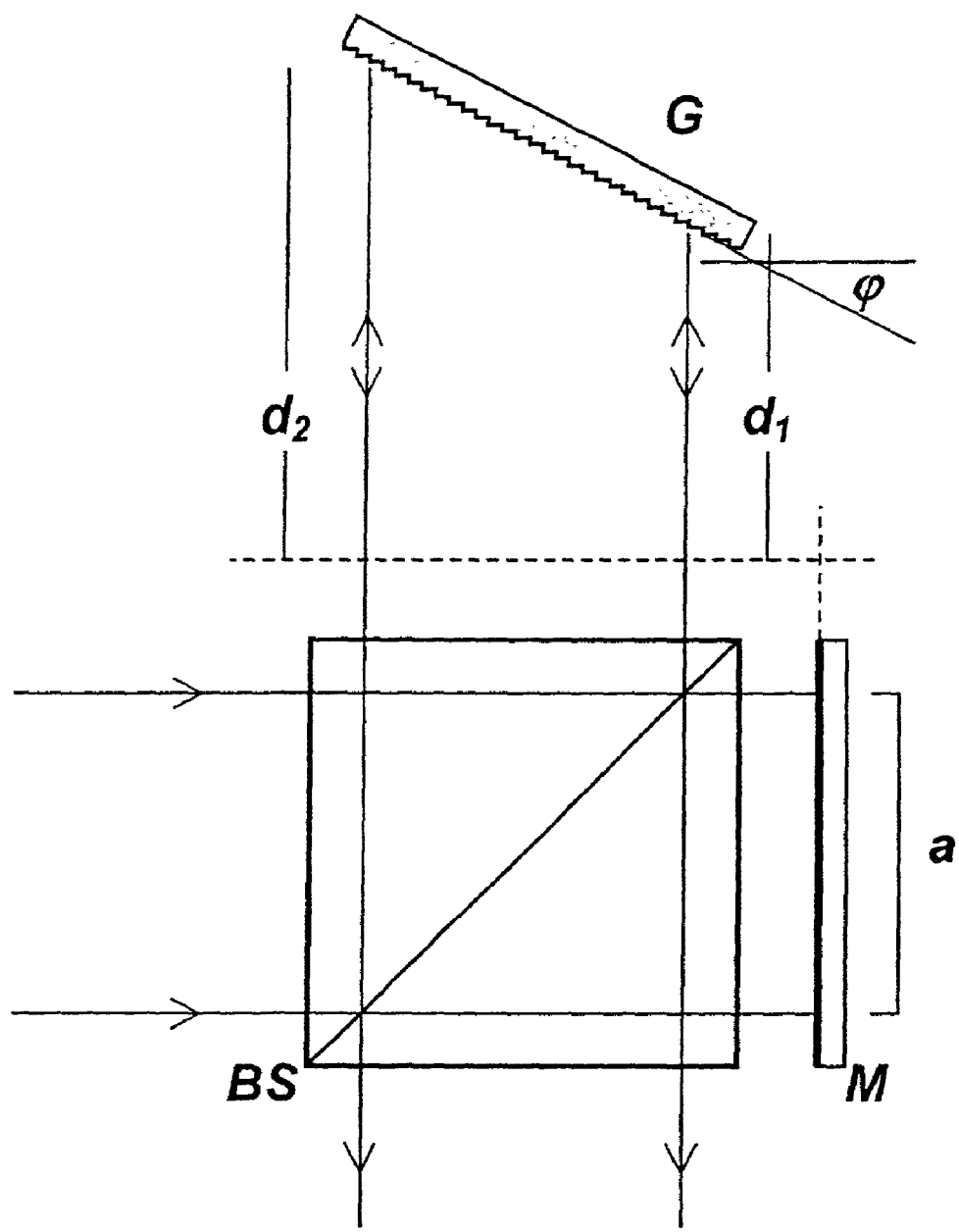

The relationships can be represented as follows for the example of the arrangement shown in FIG. 12:

The difference in the optical path lengths of the part rays brought to interference is between $2*d_1$ and $2*d_2$. A path distance $2*(d_2-d_1)$ is used from the optical grating for the spectral selection. The coherence length corresponding to this difference defines the spectral resolution of the apparatus. Furthermore, an interference signal is only generated when the incident radiation shows coherence properties or auto-correlation properties in the range of the optical path length differences between $2*d_1$ and $2*d_2$.

In an application in the area of optical spectroscopy, line spectra can be recorded selectively in this manner. In this case, only spectrally narrow-band components of the incident radiation having coherence lengths larger than 2*$d_1$ contribute to the signal measured.

In an application in the area of optical data transfer, carriers with auto-correlation properties in the region between 2*$d_1$ and 2*$d_2$ can be recorded or measured selectively. This is interesting in particular for an application in the area of coherence length multiplexing.

The special advantage of the arrangement for both application areas can be found in the fact that the spectral resolution (spectroscopy) or bandwidth (data transfer) can be set independently of the line width (spectroscopy) or auto-correlation position (data transfer) to be selected.

Another aspect of the invention provides that the apparatus has means for the rotation of the interferometer or means for the changing or for the selection of the angle of incidence which allow a setting of the spatial frequency or spatial frequencies of the interference pattern produced.

The wavelength range which the arrangement without moving parts can detect is given by the detector's ability to detect the corresponding spatial frequencies in the interference pattern. It can be of particular advantage for a technical realization of the arrangement to obtain the selection of a wavelength, that is in this case the adjustment of the interferometer such that the spatial frequencies resulting for this wavelength range can be detected by the detector, by a rotation of the interferometer as a whole or by a suitable change to the angle of incidence. For this design, the interferometer itself does without any moving elements—with the exception of the optionally required means for phase modulation—and can nevertheless be used for different wavelength ranges.

In this case, the components of the interferometer can be fixed against one another, which has an advantageous effect on the stability of the adjustment. The requirement for the wavelength matching via the angle of incidence is that the angle at which the part rays are superimposed in the interferometer shows a suitable dependence on the angle of incidence. This is the case, for example, when the part rays are superimposed in mirror image manner, that is the part rays must be guided via a number of mirrors differing by 1 in each case in an interferometer which asymmetrical in this respect.

In accordance with another advantageous aspect of the invention, this situation can be reached with symmetrical interferometers by the use of a retro-reflector.

Another advantageous aspect of the invention provides that the apparatus has means for the positional change of components, in particular means for the rotation of the components, which allow a setting of the spatial frequency or of the spatial frequencies of the interference pattern produced.

A simple possibility to select a wavelength range, that is in this case to make the adjustment of the interferometer such that the spatial frequencies resulting for this wavelength range are detected by the detector, is the use of means which allow the angle to be changed at which the part rays are brought to interference.

In accordance with another advantageous aspect of the invention, the change in the relative phase position of the interfering part rays and the change in the spatial frequency or spatial frequencies of the interference pattern produced take place jointly by the movement of at least one component of the apparatus.

It is advantageous to make measurements with a different relative phase position of the part rays. If the optical path lengths of the part rays are unequal and/or if the tilting of the optical elements results in a change in the difference of the optical path lengths of the part rays, then the relative phase position of the interference pattern also changes in the setting of the wavelength. This effect can be utilized directly for the measurement at different phase positions. This is particularly advantageous for a technical embodiment since a separate mechanism for the modulation of the phase position can then be omitted.

Figure 13:
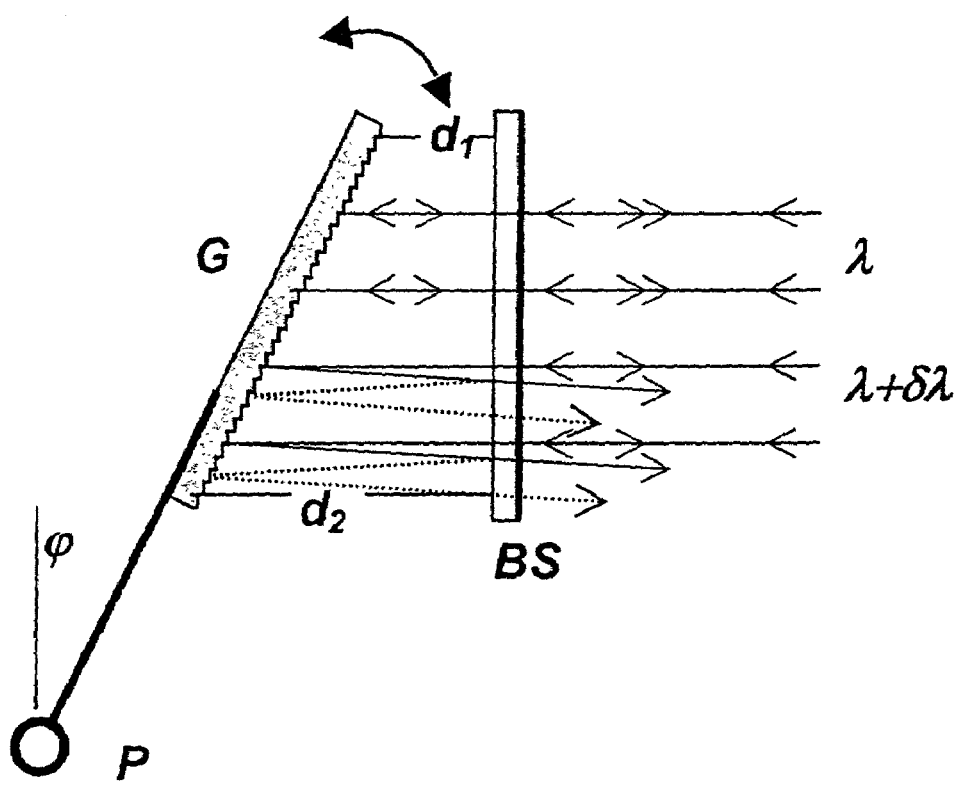

FIG. 13 shows a component for a version of the interferometer which allows the spectral selection and the modulation of the relative phase position by a joint movement. The rotation of one of the optical elements about a checkpoint P outside the ray path has the simultaneous effect, in addition to the change to the angle and thus the setting of the selected wavelength, of a change in the optical wavelength and thus a modulation of the relative phase position.

In accordance with another advantageous aspect of the invention, the spectrally dispersive or diffractive element is a multiplex grate, a multiplex hologram or a computer generated hologram (CGH).

When a two-dimensionally resolving detector is used, it can be particularly advantageous to use spectrally dispersive elements which do not just effect a simple deflection of the respective part ray. The generation of complex interference patterns appears advantageous in particular in connection with the correlation methods illustrated. Such complex patterns optionally show a more sharply defined correlation signal than simple strip patterns.

Figure 14:
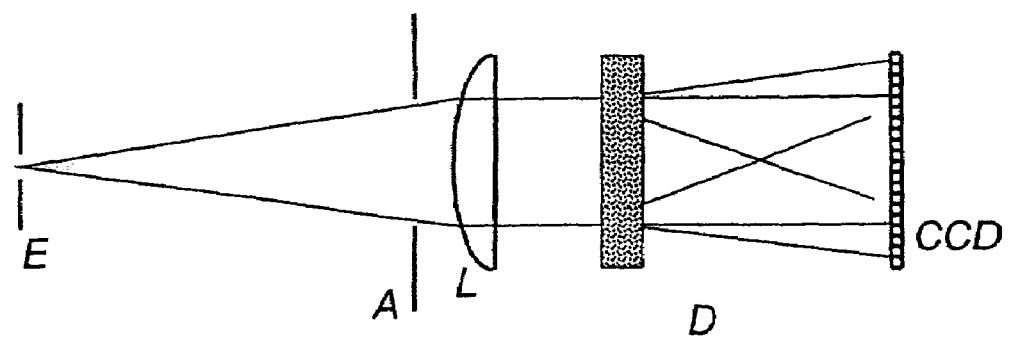

A technically particularly simple arrangement uses a spectrally dispersive or diffractive optical element that is simultaneously used as a beam splitter and directly produces an interference pattern at the position of the detector. FIG. 14 shows such an arrangement using a diffractive optical element in transmission. The transmitted, unrefracted part ray interferes with a plurality of part rays, which are diffracted in different directions and which in turn interfere with one another, and thus produces a complex interference pattern (speckle pattern). The same effect can be achieved by a glass body with an irregular surface being introduced into the ray. This very simple arrangement is particularly suitable for the use of very "irregular" spectrally dispersive or diffractive optical elements.

It the optical element is rather a regular one, in particularly a prism with mirror-coated semi-reflectivity or a diffraction grating, then it can be technically advantageous to again superimpose the resulting part rays by exactly this optical element or a like optical element in order to produce the interference pattern.

Figure 15:
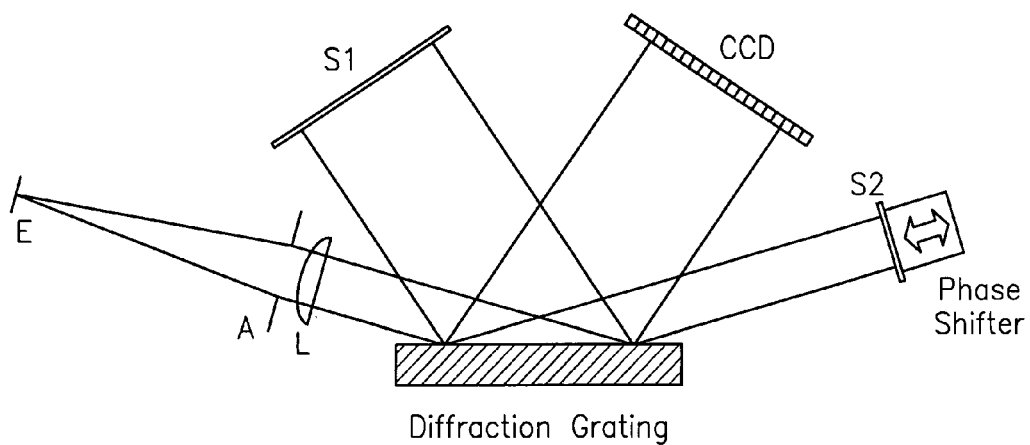

An arrangement of an apparatus of the invention which is of very particular technical advantage is shown by FIG. 15. In this case, a diffraction grating is used in reflection. The light ray incident via the entrance aperture "E", the aperture diaphragm "A" and the collimator lens "L" is first split at the diffraction grating into a reflected part ray and a diffracted part ray. In the geometry illustrated, the diffraction of the first order takes place at a relatively large angle so that no higher orders of diffraction can occur. The initially diffracted part ray is reflected back by the mirror S1 and reflected on to the detector by the diffraction grating, while the initially reflected part ray is reflected back by the mirror S2 and diffracted on to the detector. The required interference pattern is produced at the detector.

The modulation of the phase position can optionally take place via S2 ("phase shifter"); the angle at which the combined rays interfere can optionally be adjusted via S1.

In addition to the extremely compact setup, the arrangement shows further advantages:

When a periodic diffraction grating is used, the positions of equal optical path length and thus maximum amplitude or modulation for the different wavelengths are (unlike a normal Fourier transform spectrum!) at different points of the detector. This has a favorable effect on the required dynamic range of the detector elements. For special applications, for instance in chemometry the detections of a substance by the determination of spectral "fingerprints" in certain areas of an absorption spectrum, or the simultaneous determination of certain spectral lines, special diffraction gratings can be used—as also in the other arrangements of the invention. In addition to spatially separated or spatially superimposed multiple gratings, and optionally an arrangement with a plurality of detectors, holographic elements can also be considered here which can, for example, diffract whole groups of different spectral lines at the same angle. This version can be particularly favorable when a detector is used which uses a mask to recognize patterns (optical correlation method).

The correlation of a measured interference pattern required for a measurement with the interference pattern known for a certain spectral component or a group of spectral components can take place very advantageously directly optically with the aid of a mask and optionally of a suitable phase modulation or another type of detuning of the interferometer.

In particular the interference patterns of a spectral fingerprint having a number of spectral components can already be contained in a single mask.

Figure 16:
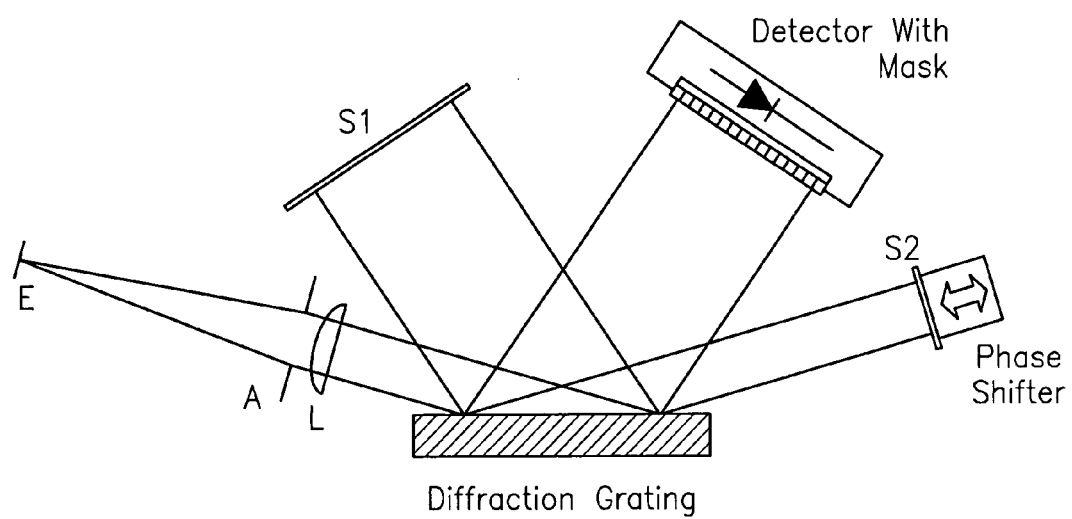

The multiple recording of the interference pattern through the mask disposed in front of the detector at different relative phase positions of the part rays shows a high dependence of the respectively measured integrated overall intensity of the signal on the relative phase position only for those spectral components of the incident light with whose resulting interference patterns the mask correlates. FIG. 16 shows a corresponding variant of the arrangement for the example of the arrangement of FIG. 15.

When perfect optical elements and a sufficiently small light source or light entrance area are used, the optical spectrum can be gained by Fourier transformation of the interference pattern.

When not completely perfect optical elements or larger entrance diaphragms are used and in particular when additional dispersive elements are used which influence the wavefronts in dependence on the position and wavelength, the resulting interference patterns cannot be represented by sine or cosine functions. Nevertheless, the single spectral components can be determined by means of the then present interference patterns by correlation to the extent that the basic patterns produced in each case by a single spectral component to be investigated are unambiguous.

This method is thus also suitable for the apparatuses represented which use very "irregular" spectrally dispersive or diffractive optical elements.

It is particularly favorable to gain the required interference patterns for the individual spectral components by a measurement with a subsequent resealing.

It is furthermore particularly favorable to make the record of the interference pattern at different relative phase positions. In addition to the favorable influence on the signal to noise ratio, optionally artifacts of the measuring process are eliminated in this way.

The measurement at different relative phase positions can in particular be helpful in the measurement of the interference patterns of the individual spectral components (basic functions). With subtractions of interference patterns recorded in phase opposition, the signal portions are summed, but constant background and artifacts of the measuring process largely eliminated.

An optical spectrum using the previously defined apparatus is advantageously calculated according to a method which comprises the following steps: first, a plurality of interference patterns are recorded for different relative phase positions of the interfering part rays. In a further step, a highly resolved interference pattern or highly resolved components of an interference pattern are calculated, whereby the differently pronounced phase shift of the spectral components of the part rays contributing to the interference is taken into account.

Figure 17:
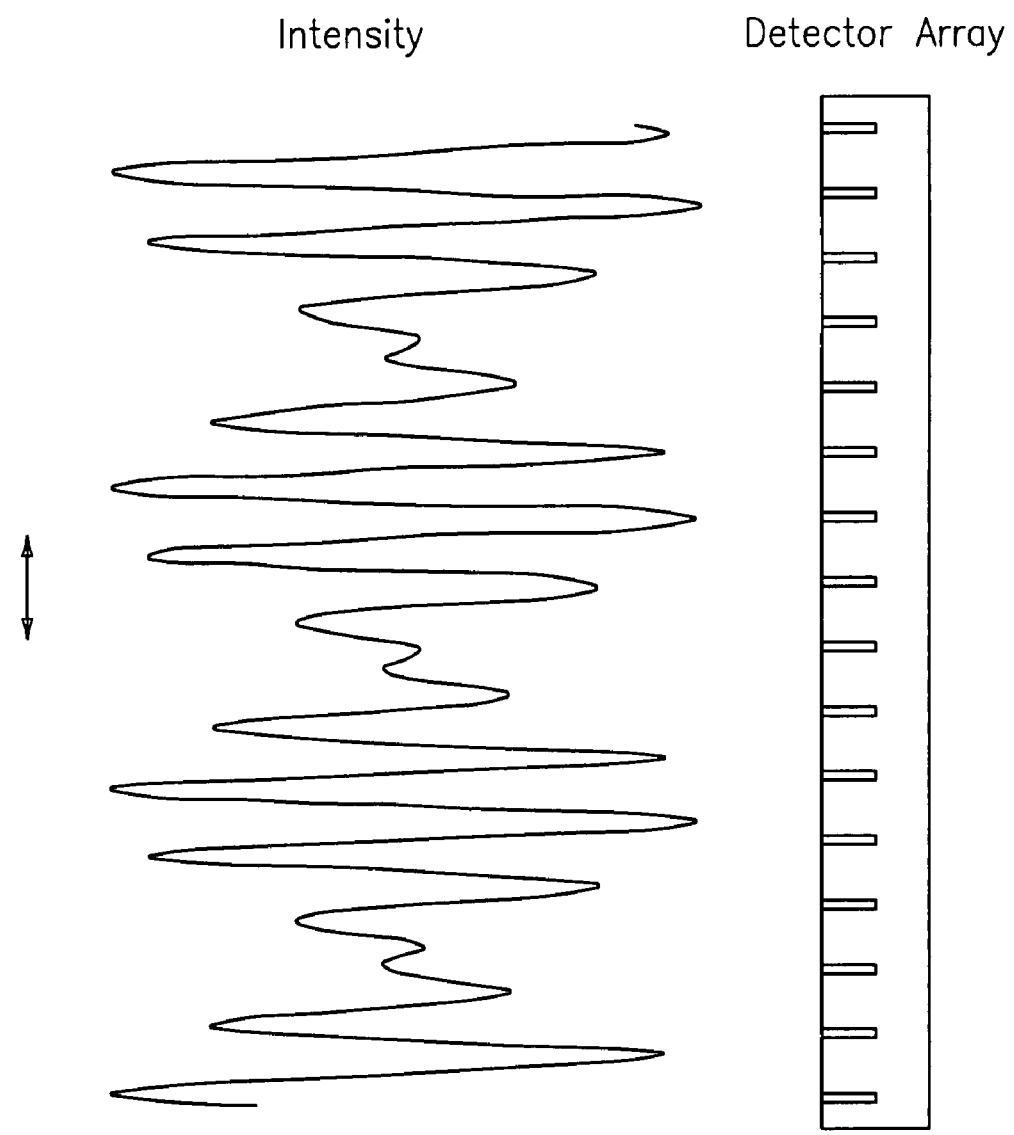

An apparatus having an array detector approximately in accordance with FIG. 17 allows methods which, at the detector, move or change the resulting interference pattern with the aid of a change in the relative phase position of the part rays brought to interference such that by a plurality of measurements at different phase positions, the spatial resolution is increased at which the interference pattern is measured. The apparent movement of the different components of the interference pattern produced by the change in the phase position allows a certain range of the interference pattern to be detected with high resolution step-wise with the individual elements of the detector. In this respect, it must be observed that the very small changes in the optical path lengths, such as are produced by the means to adjust the relative phase position of the part rays brought to interference, can effect macroscopic "shifts" in the interference pattern and that in this respect the different spectral components of the interference pattern move at different strengths, optionally even in different directions.

The apparatuses of the invention become useable as spectrometers by the method of the invention. In an ideal interferometer, the interference pattern of a spectral component has a one-dimensional sinusoidal modulation of the intensity with a spatial frequency which depends only on the wavelength of the incident light. The respective portions of different spectral components can in this case be gained by Fourier transformation of the interference pattern.

A real spectrometer, and in particular the different variants of apparatuses of the invention, show more complex interference patterns. The spectral components can be determined with the aid of the method of the invention.

Figure 18:
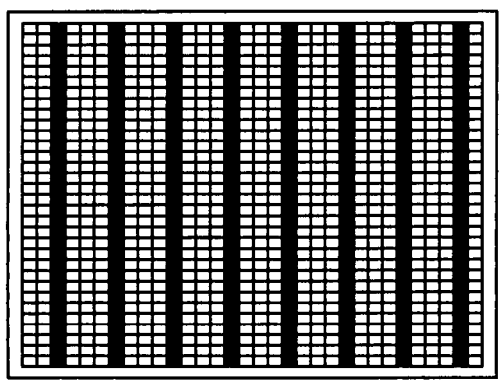
Figure 18:
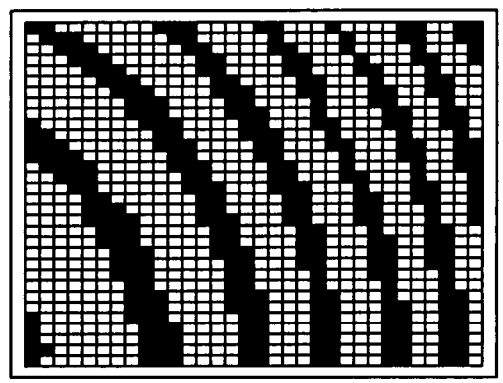

FIG. 18 shows simulated shots of interferograms through a CCD, with the measurement of an "ideal" interferogram on the left and a realistic simulation starting from non-perfect optical elements on the right.

The optical elements of an apparatus of the invention do not have to meet the demands for the application of the method of the invention which are as a rule made on components of optical interferometers.

Figure 19:
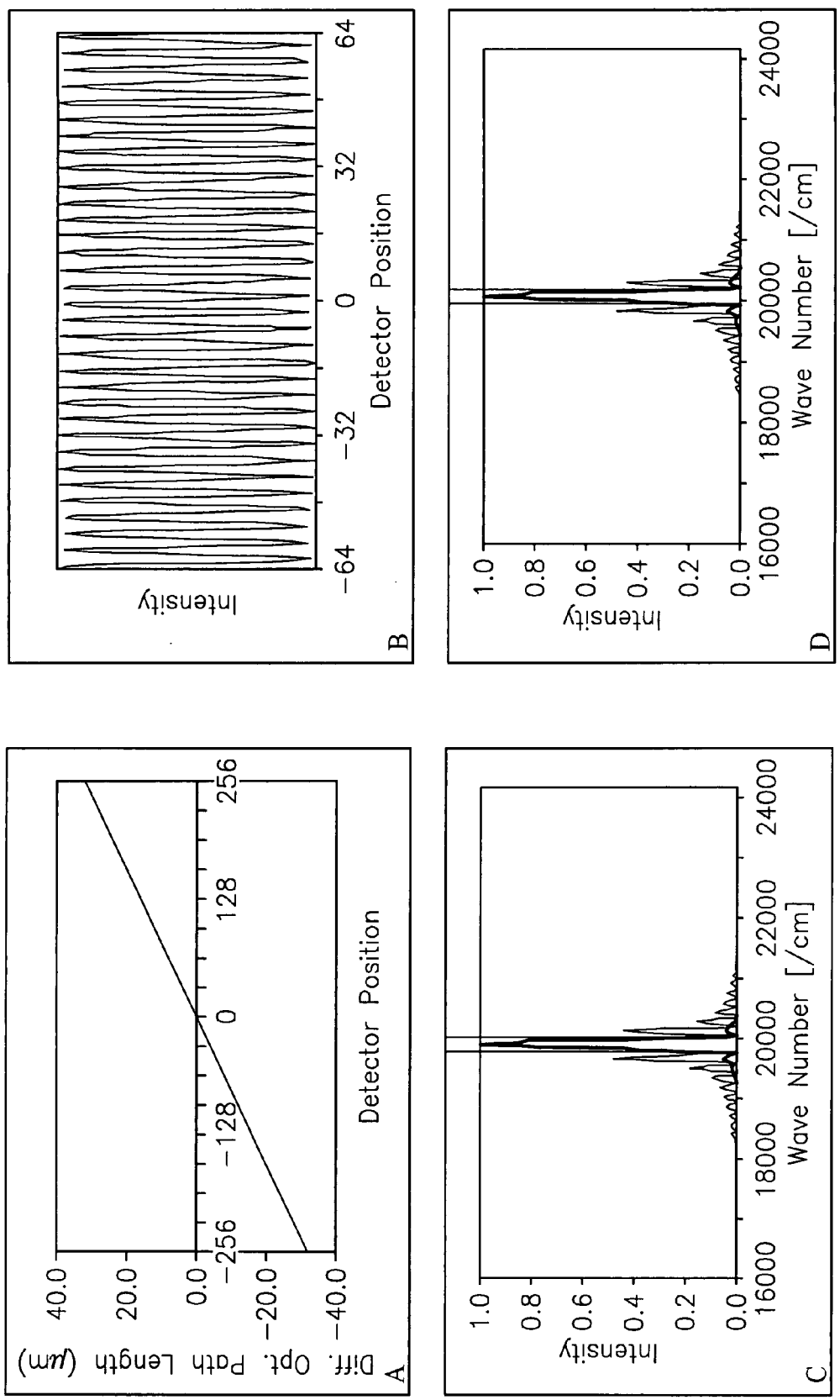
Figure 20:
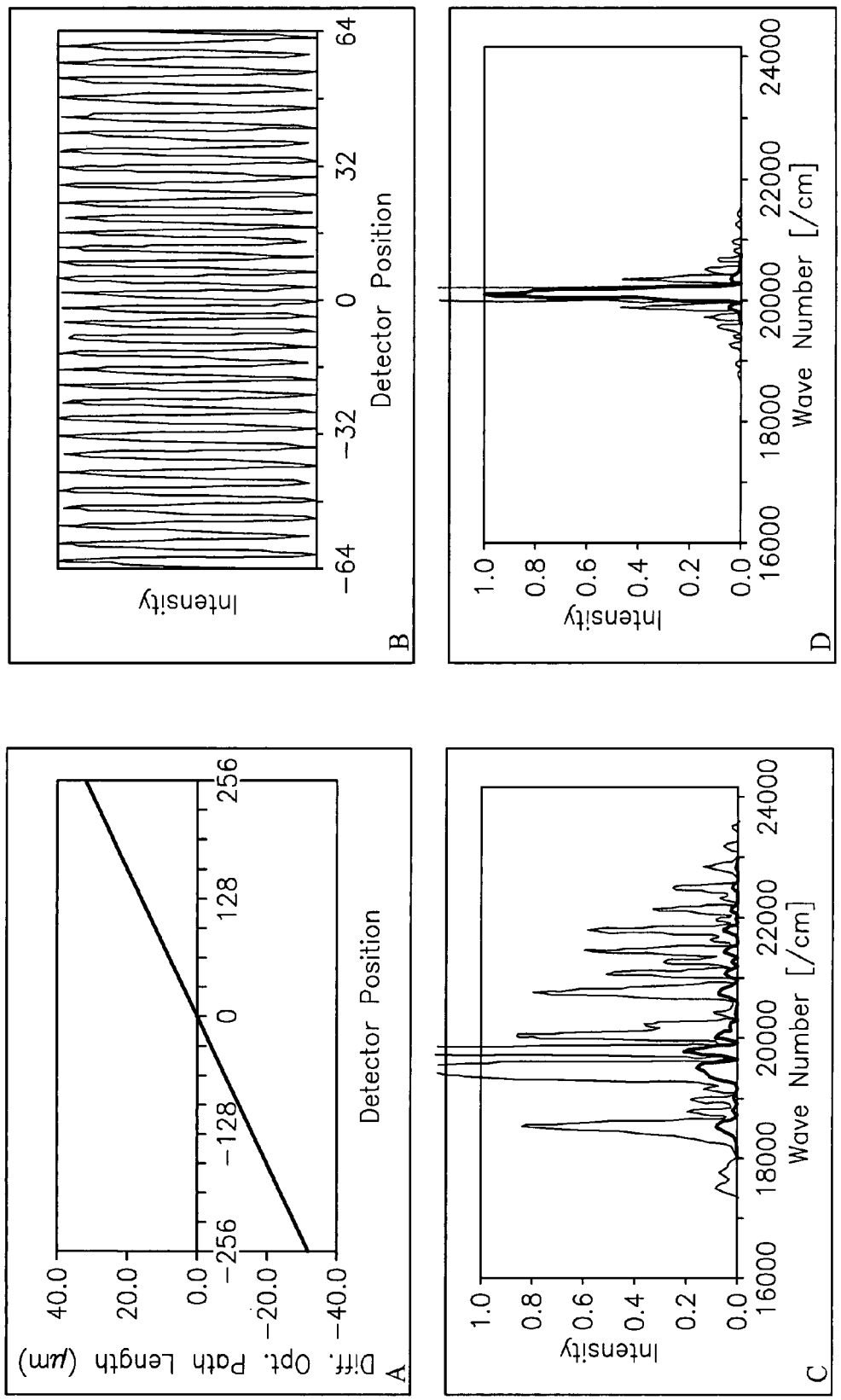
Figure 21:
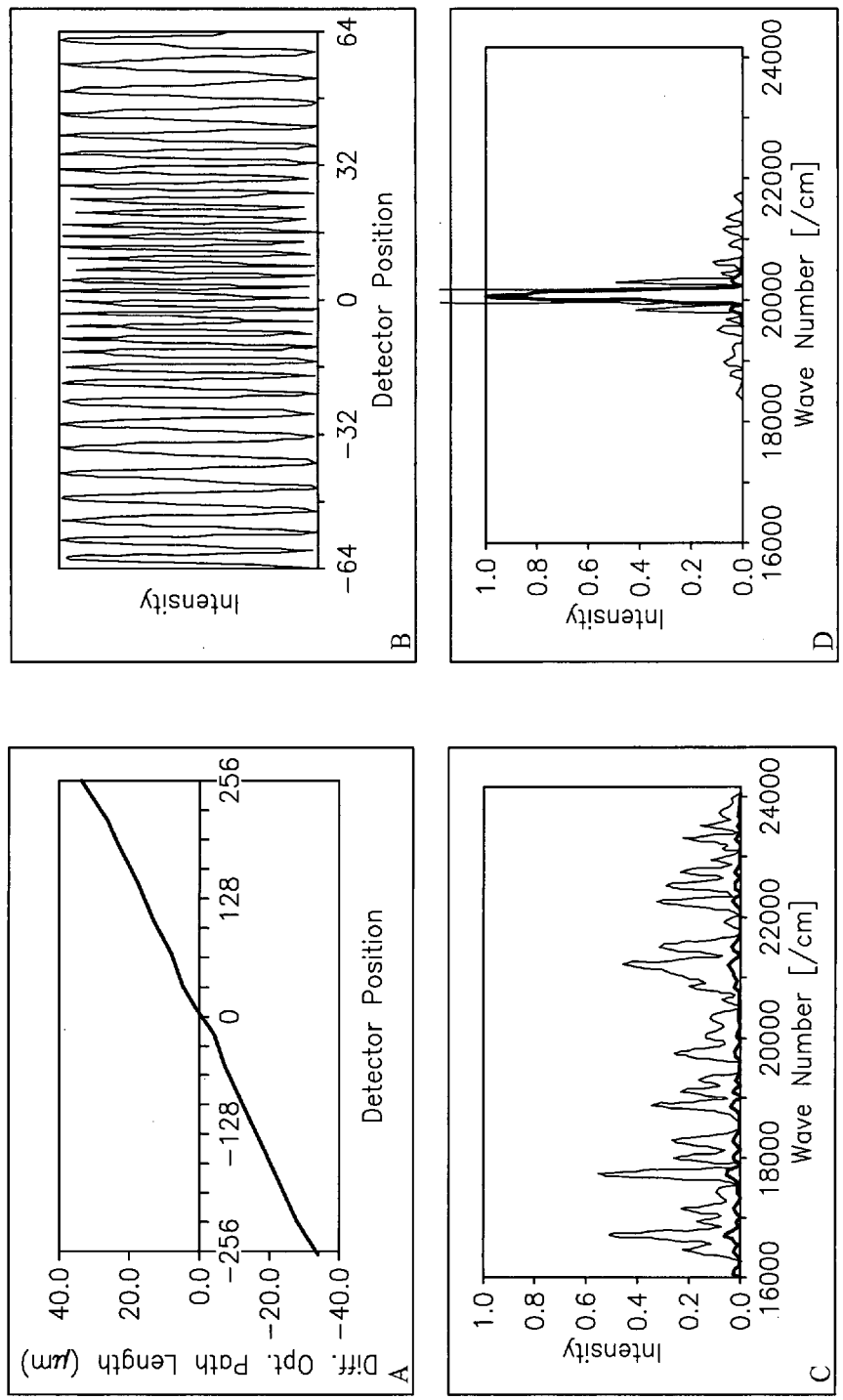

FIGS. 19 to 21 illustrate the advantages of the new method by way of a numeric simulation for a linearly spatially resolving detector having 512 elements. The figure parts A each show the differences in the optical path lengths of two part rays contributing to the interference dependent on the position of the respective element of the detector. The figures parts B each show a section of the signal recorded by the detector. The figure parts C and D each show the reconstructed spectrum of a monochromatic source. In figure part C, determined as a comparison by Fourier transformation; in figure part D determined by the method of the invention. The figure parts C and D show the reconstructed spectrum (thick line) each additionally also banked tenfold (thin line).

FIG. 19 initially shows a simulation under the assumption of an absolutely perfect optical apparatus, that is the differences in the optical path lengths of two part rays contributing to the interference are linearly related to the position of the respective element of the detector (FIG. 19A). The interference pattern of a spectral component is sinusoidal, the corresponding measured interference pattern (FIG. 19B) shows sampling artifacts depending on the spatial frequency, but reproduces the interference pattern well.

The situation corresponds in this specific case approximately to the measurement by a Fourier transform spectrometer, although recorded with a completely different apparatus. The spectrum can accordingly be determined by Fourier transformation (FIG. 19C). The method of the invention by correlation with measured basic patterns shows the same result (FIG. 19D).

FIG. 20 shows a corresponding simulation under the assumption of a not completely perfect optical arrangement. The relationship between the differences of the optical path lengths of the involved rays and the position of the respective element of the detector is accordingly not perfectly linear (FIG. 20A). The resulting interference pattern is no longer exactly sinusoidal and shows light variations in the spatial frequency (FIG. 20B). The attempt to regain the spectrum by Fourier transformation fails (FIG. 20C). The method of the invention is in a position to reconstruct the spectrum without a loss in quality (FIG. 20D).

FIG. 21 shows the corresponding simulation under the assumption of very defective optical elements, with a correspondingly still monotone, but no longer linear relationship between the differences in the optical path lengths of the involved rays and the position of the respective element of the detector (FIG. 21A). The resulting interference pattern is correspondingly irregular (FIG. 21B). The Fourier transformation does not lead to any result here (FIG. 21C). The spectrum can also be reconstructed almost without any loss in quality with the aid of the method of the invention (FIG. 21D).

The invention claimed is:

1. An apparatus for optical spectroscopy having
   means for producing an interference pattern by superimposing part rays,
   a spatially resolving detector structured and arranged to record the thus-produced interference pattern, and
   spectrally dispersive or diffractive optical elements comprising as said interference pattern-producing means, a diffraction grating (G), structured and arranged to influence wavefronts of at least one of part rays involved in the interference pattern,
   wherein said diffraction grating (G) is structured and arranged as a beam splitting device and to produce the part rays at different orders of orders of diffraction, and
   additionally comprising means arranged for reflecting back both part rays to said diffraction grating (G), structured and arranged such that one of the two part rays to be superimposed is reflected by said grating (G) at zero order diffraction, the other part ray is diffracted by said diffraction grating (G) at a first order diffraction and said part rays have different diameters.

2. The apparatus of claim 1, wherein said reflecting means comprise mirrors (S1, S2).

3. The apparatus of claim 1, additionally comprising an optical resonator combined in at least part of said apparatus.

4. The apparatus of claim 1, additionally comprising said detector structured and arranged to resolve spatially one-dimensionally and/or scans.

5. The apparatus of claim 1, additionally comprising said detector structured and arranged to resolve spatially two-dimensionally and/or scans.

6. The apparatus of claim 1, additionally comprising means for allowing change or modulation of relative phase position of the part rays.

7. The apparatus of claim 6, wherein said means for allowing change or modulation of relative phase position include a phase shifter for allowing change or modulation of phase shift of the part rays.

8. The apparatus of claim 1, comprising multiple components of said apparatus or parts thereof.

9. The apparatus of claim 1, additionally comprising means for changing difference in optical path length of the rays brought into interference.

10. The apparatus of claim 1, additionally comprising means for setting path length difference of the part rays brought to interference such that light components contributing to interference can be selected based upon coherence properties.

11. The apparatus of claim 1, additionally comprising means for changing position of the optical elements of the apparatus.

12. The apparatus of claim 11, wherein said changing means include means for rotating the optical elements, to allow adjustment of spatial frequency or frequencies of the thus-produced interference pattern.

13. The apparatus of claim 11, comprising
   at least one component structured and arranged to be movable to jointly change both relative phase position of the interfering part rays and change in spatial frequency or frequencies of the interference pattern thus-produced.

14. The apparatus of claim 1, wherein at least one of said spectrally dispersive or diffractive elements is selected from the group consisting of a multiplex grating, a multiplex hologram, a holographic-optical element, and a computer-generated hologram.

15. The apparatus of claim 1, wherein said detector comprises a spatial mask structured and arranged to correlate with at least one interference pattern to be detected.

16. The apparatus of claim 1, wherein said spatially-resolving detector comprises the combination of a non-spatially resolving detector with a spatial mask to provide capability of recognizing spatial modulation.

17. The apparatus of claim 1, excluding moving components.

18. The apparatus of claim 1, wherein said diffraction grating (G) is structured and arranged to asymmetrically split an incoming ray into the part rays having a first order of diffraction with at least one of the part rays remaining undiffracted and having the $0^{th}$ order of diffraction.

19. The apparatus of claim 17, wherein said diffraction grating (G) is structured and arranged to asymmetrically split an incoming ray into the part rays having a first order of diffraction with at least one of the part rays remaining undiffracted and having the $0^{th}$ order of diffraction.

20. The apparatus of claim 1, wherein said optical elements include
   an entrance opening (E) for incident light,
   an aperture diaphragm (A) situated downstream of said entrance opening (E),
   a first lens (L1) situated downstream of said aperture diaphragm (A),
   a combined prism and grating situated downstream of said first lens (L1) and onto which the incident light is first imaged, and a second lens (L2) situated downstream of said combined prism and grating said detector is situated downstream of said second lens (L2), and said combined prism and grating carry two components of spatial frequencies such that the first order of diffraction imaged onto said detector through said second lens (L2) is composed of two components diffracted at slightly different angles and said combined prism and grating also acting as a beam splitter.

21. The apparatus of claim 3, wherein said means for producing an interference pattern additionally comprise a semi-reflecting mirror (S), and said diffraction grating (G) is structured and arranged at an angle such that light of certain wavelength is reflected back to said mirror (S) and interferes with light originally reflected from said mirror (S).

22. The apparatus of claim 21, wherein said optical elements additionally comprise an entrance opening (E) for incident light, an aperture diaphragm (A) situated downstream of said entrance opening (E), and a lens (L) situated downstream of said aperture diaphragm (A) for collimating the incident light, said means for producing an interference pattern additionally comprise a second beam splitter (S2) situated downstream of said lens (L), and said detector is situated to receive an interference pattern guided from said second beam splitter (S2), with said first beam splitter (S1) and grating (G) constituting said optical resonator, said grating (G) being rotatable to change wavelength of said resonator and said first beam splitter (S1) being displaceable to influence relative phase position of the part rays.

23. The apparatus of claim 21, wherein said optical elements additionally comprise an entrance opening (E) for incident light, an aperture diaphragm (A) situated downstream of said entrance opening (E), and a lens (L) situated downstream of said aperture diaphragm (A) for collimating the incident light, and said detector is situated downstream of said diffraction grating (G) and positioned such that light reflected by said mirror (S) without diffraction is directly guided to said spatially-resolving detector, with said grating (G) being rotatable to change wavelength of said resonator and said mirror (S) being displaceable to influence relative phase position of the part rays.

24. The apparatus of claim 21, wherein said optical elements additionally comprise an entrance opening (E) for incident light, an aperture diaphragm (A) situated downstream of said entrance opening (A), and a lens (L) situated downstream of said aperture diaphragm (A) for collimating the incident light, said detector is situated downstream of said grating (G), and with said grating (G) and beam splitter (S) both mounted upon a glass carrier of substantially triangular cross-section.

25. The apparatus of claim 1, wherein said optical elements additionally comprise an entrance opening (E) for incident light, an aperture diaphragm (A) situated downstream of said entrance opening (E), and a lens (L) situated downstream of said aperture diaphragm (A) for collimating incident light, said diffraction grating (G) is arranged downstream of said lens (L) to first split the incident light into a reflected part ray and diffracted part ray, with the diffraction of the first order taking place at a sufficiently large angle such that higher orders of diffraction do not occur, said reflecting means comprise a first mirror (S1) positioned to reflect back the initially-diffracted part ray to said grating (G), and a second mirror (S2) positioned to reflect back to said grating (G) the initially-reflected part ray, and said detector is positioned to receive respective rays from said grating (G) and the thus-produced interference pattern, with said grating (G) positioned to reflect the part ray from said first mirror (S1) to said detector and diffract the part ray from said second mirror (S2) to said detector.

26. The apparatus of claim 25, wherein said second mirror (S2) additionally constitutes a phase shifter.

27. The apparatus of claim 25, additionally comprising a mask situated in front of said detector and containing interference patterns coded therein.

28. The apparatus of claim 18, which constitutes an asymmetrically-arranged interferometer.

29. The apparatus of claim 27, wherein said mask comprises multiple interference patterns recorded therein at different relative phase positions of the part rays, resulting in high dependence of the respectively-measured, integrated overall intensity of the signal on the relative phase position only for spectral components of the incident light with whose resulting interference patterns the mask correlates.

30. The apparatus of claim 7, additionally comprising a mask situated in front of said detector and containing interference patterns coded therein.

31. An apparatus for optical spectroscopy, comprising means for producing an interference pattern by superimposing part rays, a spatially resolving detector structured and arranged to record the thus-produced interference pattern, spectrally dispersive or diffractive optical elements, including, as said interference pattern-producing means, a diffraction grating (G), structured and arranged to influence wavefronts of at least one of part rays involved in the interference pattern, means arranged for reflecting back to said diffraction grating (G), both part rays such that one of the two part rays to be superimposed is reflected by said grating (G) at zero order diffraction, the other part ray is diffracted by said diffraction grating (G) at a first order diffraction and said part rays have different diameters, and at least one diffractive optical element having a non-periodic diffraction structure, wherein said diffraction grating (G) is structured and arranged to produce the part rays at different orders of diffraction.

32. An apparatus for optical spectroscopy, comprising means for producing an interference pattern by superimposing part rays, a spatially resolving detector structured and arranged to record the thus-produced interference pattern, spectrally dispersive or diffractive optical elements, including, as said interference pattern-producing means, a diffraction grating (G) structured and arranged to influence wavefronts of at least one of part rays involved in the interference pattern, means arranged for reflecting back both part rays to said diffraction grating (G), such that one of the two part rays to be superimposed is reflected by said grating (G) at zero order diffraction, the other part ray is diffracted by said diffraction grating (G) at a first order diffraction and said part rays have different diameters,
an optical resonator formed by at least part of said apparatus, and
at least one spectrally-dispersive or diffractive optical element being arranged on an inside of the resonator, or at least one element of the resonator being spectrally dispersive or diffractive, wherein said diffraction grating (G) is structured and arranged to produce the part rays at different orders of orders of diffraction.

* * * * *